June 22, 1954 E. M. BRADBURD 2,681,953

NEUTRALIZING CIRCUIT FOR GROUNDED-GRID AMPLIFIERS

Filed Jan. 23, 1951

INVENTOR.
ERVIN M. BRADBURD
BY Percy P. Lantzy
ATTORNEY

Patented June 22, 1954 2,681,953

UNITED STATES PATENT OFFICE 2,681,953

NEUTRALIZING CIRCUIT FOR GROUNDED-GRID AMPLIFIERS

Ervin M. Bradburd, Fairlawn, N. J., assignor to International Standard Electric Corporation, New York, N. Y., a corporation of Delaware Application January 23, 1951, Serial No. 207,383

2 Claims. (Cl. 179—171)

Figure 1:
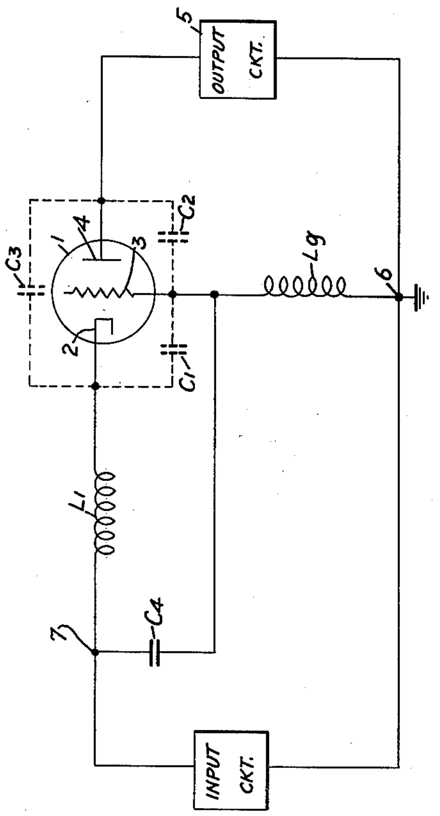

The present invention relates to amplifiers and more particularly, to a vacuum tube amplifier which is neutralized at its frequency of operation.

Various methods of neutralizing vacuum tube amplifiers have heretofore been devised which are satisfactory for particular circuits and for moderately high frequencies, for example, up to forty megacycles per second, and some of these methods relay upon grounding of the control or grid electrode of the vacuum tube. At higher frequencies, many of these methods become impractical not only because it is difficult, if not impossible, to construct circuit components having the impedances necessary for neutralization of the amplifier but also because the portions of the amplifier circuits formed by the tube electrodes and leads within the tube envelope are no longer of negligible impedance. The latter effect may, for example, prevent any electrode of the tube from being at ground potential and may when an attempt is made to employ one of the above-mentioned methods prevent connection of a neutralizing component to the proper electrical point in the amplifier circuit.

In United States Patent No. 2,247,442, there is described a vacuum tube amplifier in which reaction between the input and output circuits due to the inherent capacitances between the electrodes of the vacuum tube is prevented by inserting an inductance of a particular value in series with the control or grid electrode of the tube. This inductance is so chosen that if the tube transfers no energy from the input circuit to the output circuit or vice versa due to electron emission, i. e., the tube is cold or biased to cut-off, an exciting generator connected between the cathode of the tube and ground produces no voltage between the anode of the tube and ground and if the generator is connected between the anode and ground, no voltage is produced between the cathode and ground. This neutralizing arrangement is useful at frequencies higher than the arrangements mentioned above because the impedances of the grid electrode and its lead within the tube may form part of the neutralizing inductance. However, with this neutralizing arrangement, there is coupling between the anode circuit and the grid and the cathode terminals which is of such a sense as to cause positive feedback in the amplifier and hence, which produces a positive feedback voltage between the cathode and the grid. Under certain conditions of operation, therefore, the amplifier will be unstable and it is desirable that the amplifier also be neutralized with respect to such coupling.

It is an object of my invention to provide an amplifier which is more stable and reliable in operation than amplifiers of a similar type heretofore known.

It is a further object of my invention to provide a neutralizing arrangement for amplifiers which may be operated at frequencies above forty megacycles per second.

It is a further object of my invention to provide a vacuum tube amplifier of the "grounded grid" type in which undesirable feedback between all circuits connected to the electrodes of the tube is substantially neutralized.

Other objects and advantages of my invention will be apparent from the detailed description of the invention given hereinafter by way of example only and setting forth the manner in which I now prefer to practice the invention.

In accordance with my invention, an amplifier comprising a vacuum tube having at least three electrodes and comprising input and output circuits connected to two of the electrodes has a neutralizing impedance connected to a third electrode and a third circuit connected between one of the two electrodes and the third electrode, the third circuit having a negligible impedance at the operating frequency of the amplifier.

In accordance with the preferred embodiment of my invention, the amplifier comprises a vacuum tube having cathode, grid and anode electrodes, an input circuit connected between the cathode electrode and ground and an output circuit connected between the anode electrode and ground. A series resonant circuit comprising an inductance and a condenser is connected between the cathode and the grid electrodes with the inductance being connected in series with the input circuit to the cathode electrode. A second inductance whose value is determined by the inherent capacitances between the tube electrodes is connected between the grid electrode and ground so as to prevent undesirable reaction between the input and output circuits.

Figure 2:
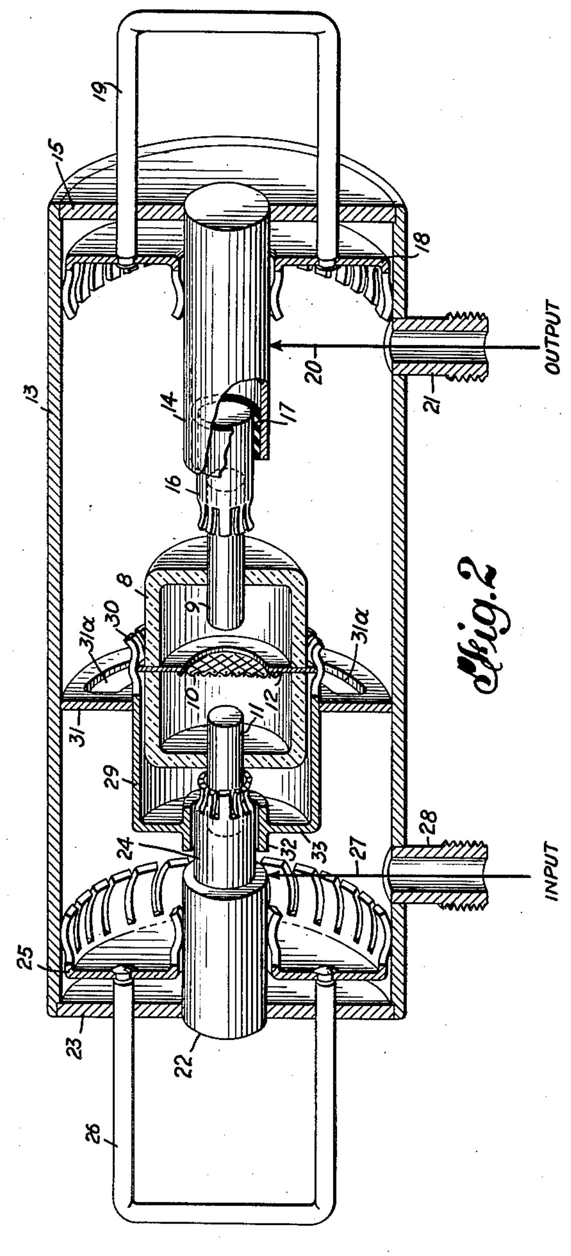

My invention may be better understood by referring to the following detailed description of the invention and to the accompanying drawing, in which:

Fig. 1 is a circuit diagram of a preferred embodiment of a neutralized amplifier of my invention; and Fig. 2 is a perspective view, partly in section and partly schematic, of an amplifier employing coaxial line sections and neutralized in accordance with my invention.

Referring to Fig. 1 which shows an electrical circuit diagram of one embodiment of the amplifier of my invention, the amplifier comprises a vacuum tube 1 having at least three electrodes. In accordance with the preferred embodiment of my invention, the vacuum tube 1 comprises an input or cathode electrode 2, a control or grid electrode 3 and an output or anode electrode 4. The source of D. C. energization and biasing potentials and the cathode heating circuit have been omitted for the sake of simplicity of illustration but these circuits may be of any well known type. In a tube of the type shown, there are inherent capacitances between the pairs of electrodes and these inherent capacitances have been illustrated by the dotted symbols designated $C_1$, $C_2$ and $C_3$. An output circuit 5 is connected between the output or anode electrode 4 and a common terminal 6 which may be at ground potential and which may, for example, be the chassis of the assembled amplifier. An input circuit is connected between the terminal 7 and the common terminal 6. An inductance $L_1$ is connected in series between the cathode 2 and the input circuit. A series resonant circuit comprising the inductance $L_1$ and a condenser $C_4$ is connected between the cathode 2 and the grid 3 and this series resonant circuit has a negligible impedance at the frequency of operation of the amplifier. A neutralizing impedance in the form of an inductance $L_g$ is connected between the grid 3 and the common terminal 6.

As indicated above, for substantially complete neutralization of the amplifier, the voltage between the grid 3 and the cathode 2 and between the cathode 2 and the common terminal 6 should be substantially zero when there is no coupling through the tube 1 due to electron emission and when a generator operating at the operating frequency of the amplifier is connected between the anode and the common terminal 6. Also, when the generator is connected between the junction point of the inductance $L_1$ and the condenser $C_4$ and the common terminal 6 and there is no coupling through the tube 1 due to electron emission, the voltage between the anode 4 and the common terminal 6 should be substantially zero. Since the circuit comprising the inductance $L_1$ and the condenser $C_4$ is series resonant at the operating frequency of the amplifier, the voltage between the cathode 2 and the grid 3 will be substantially zero at this frequency. In the preferred embodiment of the invention, for the purpose of presenting a proper impedance to the input circuit, the condenser $C_4$ has a capacity substantially equal to the inherent capacitance $C_1$ and, therefore, the inductance $L_1$ has a value substantially equal to $$\frac{1}{w^2C_4}=\frac{1}{w^2C_1}$$

where $w$ stands for $2\pi$ times the frequency of operation of the amplifier.

It may be shown by calculations similar to those set forth in the above-mentioned U. S. Patent No. 2,247,442 that reaction between the output circuit 5 and the input circut may be prevented and hence, the remaining conditions set forth above for substantially complete neutralization may be met by causing the inductance $L_g$ to have a value substantially equal to the value determined by the following relation:

$$L_g=\frac{C_3}{w^2C_1(C_2+C_3)}$$

derived as follows:

1. As previously stated it is required that $$V_{67}=0$$
$$V_{23}=0$$

2. Therefore current flowing in $L_1$ and $C_1$ equals 0.

3. Since $V_{23}=0$, $L_1$ and $C_4$ must be a resonant circuit and assuming $C_4=C_1$, then $$L_1=\frac{1}{w^2C_1}$$

and if $V_{67}=0$ then $V_{73}+V_{36}=0$.

4. Let $p=jw$.

$$(a)\qquad e_1=\left(pL_g+\frac{1}{pC_2}\right)i_1-\frac{1}{pC_2}i_2$$

where $i_1$ is the current flowing from the output circuit through 4, $C_2$ and $L_g$ to 6; and $i_2$ is the current flowing through $C_3$, $L_1$, $C_4$ and $C_2$.

$$(b)\qquad 0=-\frac{1}{pC_2}i_1+\left(\frac{1}{pC_2}+\frac{1}{pC_3}\right)i_2$$

since $$\frac{1}{pC_4}+pL_1=0 \text{ (series resonant circuit)}$$

and solving for $L_1$ and $L_2$ we get:

$$i_2=\frac{\frac{1}{pC_2}}{\begin{vmatrix}\left(pL_g+\frac{1}{pC_2}\right)\frac{1}{pC_2}\\ -\frac{1}{pC_2}\left(\frac{1}{pC_2}+\frac{1}{pC_3}\right)\end{vmatrix}}e_1$$

$$i_1=\frac{\left(\frac{1}{pC_2}+\frac{1}{pC_3}\right)}{|\text{Same Denominator As } i_2|}e_1$$

5. Then $$\frac{1}{pC_4}i_2+pL_gi_1=0$$

Since $V_{73}+V_{36}=0$ $$\frac{1}{pC_4}\cdot\frac{1}{pC_2}+pL_g\left(\frac{1}{pC_2}+\frac{1}{pC_3}\right)=0$$

and $$L_g=-\frac{\frac{1}{p^2C_2C_4}}{p\left(\frac{1}{pC_2}+\frac{1}{pC_3}\right)}=-\frac{\frac{1}{p^2C_2C_4}}{\frac{1}{C_2}+\frac{1}{C_3}}$$

Since $C_1=C_4$ $$L_g=\frac{C_3}{w^2C_1(C_2+C_3)}$$

where $w$ stands for $2\pi$ times the operating frequency of the amplifier. It will be noted that because of the addition of the series resonant circuit between the cathode 2 and the grid 3, the value of the inductance $L_g$ required for neutralization of the amplifier is different from the value of the inductance in series with the grid of the amplifier disclosed in the above-mentioned patent.

Due to the fact that the impedances of the tube electrodes and their leads within the tube may form part of the neutralizing circuit, the neutralizing arrangement of my invention is particularly useful for amplifiers operating at frequencies above 40 megacycles per second. Fig. 2 shows an embodiment of a high frequency amplifier operable at frequencies above 40 megacycles per second and including the neutralizing circuit of my invention. In this figure, there is illustrated schematically one well known type of high frequency triode vacuum tube including a glass envelope 8, a cylindrical anode 9, a plane grid 10 and a cylindrical cathode 11. The grid 10 is mounted on a disc 12 which extends through the side walls of the envelope 8.

A cylinder 13 forms the outer conductor for two coaxial line sections, one of which comprises an inner conductor 14 mounted on an end wall 15. A connector 16 which may be held within the conductor 14 and which may be insulated therefrom for D. C. potentials by an insulating sleeve 17 electrically connects the anode 9 to the conductor 14 for high frequencies. The output circuit for the amplifier is formed by the conducting cylinder 13, the inner conductor 14, the connector 16 and the anode cylinder 9, and the output circuit is tunable by a cup 18 having an adjusting handle 19 secured thereto. Energy is coupled out of the output circuit by means of a line 20 (shown schematically) adjustably connected to the conductor 14 and passing through a connector 21.

The input circuit to the amplifier comprises the conductive cylinder 13 and an inner conductor comprising a portion 22 mounted on an end wall 23 and portion 24 formed by a connector attached to the portion 22. The tuning of the input circuit is adjustable by means of a cup 25 attached to a handle 26. Energy to be amplified is coupled into the amplifier by the line 27 (shown schematically) adjustably connected to the inner conductor portion 22 and passing through a connector 28.

The grid disc 12 may be engaged by a conductive cylinder 29 having resilient fingers 30. The inductance $L_g$ may take the form of an apertured disc 31 which supports the cylinder 29 or it may take any other well known form. If the disc 31 is employed, the size of the apertures 31*a* in the disc are adjusted until the value of inductance determined by the formula set forth above is obtained.

The condenser $C_4$ is formed in the amplifier shown in Fig. 2 by a ring 32 surrounding the inner conductor portion 24 and conductively connected to the cylinder 29 and hence, to the grid 10 by a partition 33. The inductance $L_1$ is formed by the cathode cylinder 11 and the portion of the inner conductor between the ring 32 and the end of the cathode 11 within the envelope 8. The values of the inductance $L_1$ and the condenser $C_4$ may be adjusted in any well known manner and may, for example, be adjusted respectively by controlling the inner diameter and the length of the cylinder 29 and by varying the size of the ring 32 and its spacing with respect to the inner conductor portion 24.

It will be seen, therefore, that the high frequency amplifier shown in Fig. 2 is electrically equivalent to the amplifier shown in the circuit diagram of Fig. 1 and is relatively simple to construct and neutralize. The amplifier shown in Fig. 2 may be employed to amplify signals over a relatively wide frequency band which preferably is centered with respect to the frequency at which the inductances $L_1$ and $L_g$ and the condenser $C_4$ are adjusted for substantially complete neutralization.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended hereto.

What is claimed as new and desired to be secured by Letters Patent of the United States is:

1. An amplifier for operation at a predetermined frequency comprising a vacuum tube having a cathode, a grid and an anode and having inherent capacitances $C_1$, $C_2$ and $C_3$ between said cathode and grid, said grid and anode and said anode and cathode, respectively, a common terminal, an input circuit connected in a circuit between said cathode and said common terminal, an output circuit connected between said anode and said common terminal, a resonant circuit coupled between said grid and said cathode, said resonant circuit comprising a coil and a condenser connected in series and being resonant at said predetermined frequency and said coil being connected in series between said input circuit and said cathode, and a second coil having an inductance $L_g$ connected between said grid and said common terminal, said second coil having substantially a value determined by the relation $$L_g=\frac{C_3}{w^2C_1(C_2+C_3)}$$

where $w$ stands for $2\pi$ times said predetermined frequency.

2. An amplifier for operation at a predetermined frequency comprising a vacuum tube having a cathode, a grid and an anode and having inherent capacitances $C_1$, $C_2$ and $C_3$ between said cathode and grid, said grid and anode and said anode and cathode, respectively, a ground terminal, a coil and a condenser connected in series between said cathode and said grid, said coil being connected to said cathode, said condenser being connected to said grid and having a capacity substantially equal to the inherent capacitance between said cathode and said grid, and said coil and said condenser being series resonant at said predetermined frequency, an input circuit connected to said coil at its end remote from said cathode and connected to said ground terminal, an output circuit connected to said anode and to said ground terminal and a second coil having an inductance $L_g$ connected to said grid and to said ground terminal, said second coil having substantially a value determined by the relation $$L_g=\frac{C_3}{w^2C_1(C_2+C_3)}$$

where $w$ stands for $2\pi$ times said predetermined frequency.

References Cited in the file of this patent

UNITED STATES PATENTS

| Number | Name | Date |
|---|---|---|
| 1,799,093 | Farnham et al. | Mar. 31, 1931 |
| 2,119,315 | Buschbeck | May 31, 1938 |
| 2,247,442 | Labin | July 1, 1941 |
| 2,271,519 | Wolf | Feb. 3, 1942 |
| 2,299,481 | Johansson | Oct. 20, 1942 |
| 2,407,074 | Green | Sept. 3, 1946 |
| 2,431,333 | Labin | Nov. 25, 1947 |

FOREIGN PATENTS

| Number | Country | Date |
|---|---|---|
| 539,802 | Great Britain | Sept. 24, 1941 |